Dec. 3, 1968   R. D. MUNSON ET AL   3,414,791
CONTROLLED RECTIFIER DC MOTOR SPEED CONTROL CIRCUIT
Filed Nov. 26, 1965

Inventor
ROBERT D. MUNSON
PHILIP M. GUNDLACH
By
Attorney

United States Patent Office 3,414,791
Patented Dec. 3, 1968

3,414,791
CONTROLLED RECTIFIER DC MOTOR SPEED CONTROL CIRCUIT
Robert D. Munson, Jennings, Mo., and Philip M. Gundlach, Belleville, Ill., assignors to Emerson Electric Co., St. Louis, Mo., a corporation of Missouri
Filed Nov. 26, 1965, Ser. No. 509,877
4 Claims. (Cl. 318—331)

ABSTRACT OF THE DISCLOSURE

A control circuit electrically connected in series with the armature and in parallel with the controlled rectifier, including a triggering circuit electrically connected to the controlled rectifier, an amplifier electrically connected to the triggering circuit, a potentiometer electrically connected to the amplifier, a switch, operative only during the off cycle, electrically connected to the armature, a capacitor electrically connected to said switch, and a feed-back resistor, electrically connected to the switch and to the amplifier with the potentiometer and to the capacitor whereby counter electromotive force generated by the armature is stored in the capacitor during the off cycle and the potential of the capacitor is imposed on the feed-back resistor whereby the counter electromotive force is compared electrically with a speed control signal from the potentiometer and the resultant potential governs the rate of the operation of the amplifier to precipitate operation of the triggering circuit, hence the controlled rectifier.

Background of the invention

This invention relates to a speed control for DC motors for which the current source is a rectified AC. It has particular and primary utility as applied to series wound DC motors to which current is supplied through a half wave rectifier, but its utility is not limited thereto. In such a motor, the speed at a given load is a direct function of the average voltage applied to the motor. Thus, with an ordinary half wave rectifier, maximum speed is achieved when the entire half cycle is applied to the motor. If any part of the half cycle is chopped off, the average voltage is reduced, and the speed of the motor is accordingly reduced. A number of circuits have been devised for controlledly limiting the energizing of the motor circuit during each cycle but they have been somewhat complicated.

One of the objects of this invention is to provide a motor speed control which is simple and at the same time highly effective.

Other objects will become apparent to those skilled in the art in the light of the following description and accompanying drawing.

Summary of the invention

In accordance with this invention, generally stated a motor control is provided in which the counter electromotive force (CEMF) of the motor, produced by the rotation of the armature in the residual magnetic field during the off half-cycle is stored in a capacitor and, is used as a speed feed-back signal. The speed feed-back signal is compared, at the base of a transistor, with a speed-command signal from a potentiometer. The difference between the two signals is amplified by means of the transistor and is used to control the conduction angle of a controlled rectifier, preferably a silicon controlled rectifier (SCR).

Description of the preferred embodiment

Figure 1:
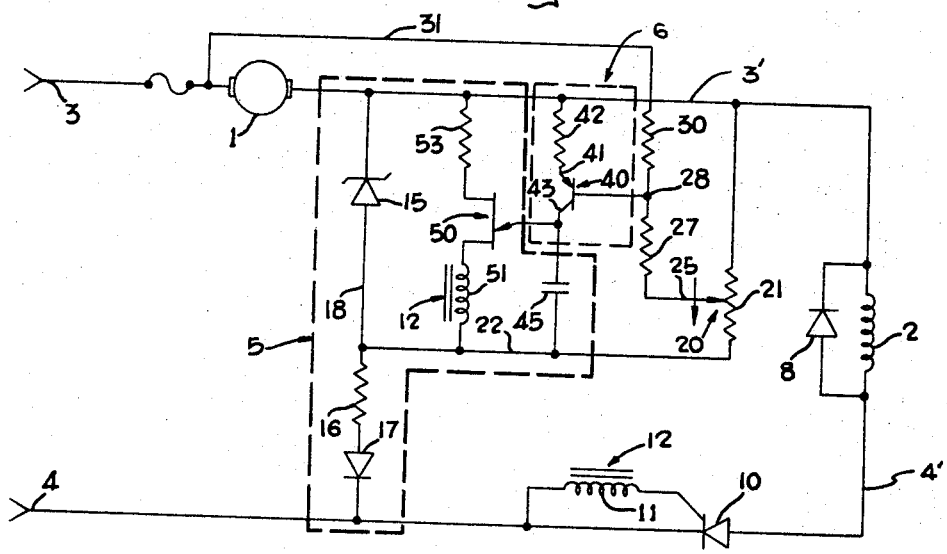
FIGURE 1 is a diagrammatic view of a simple form of control circuit of this invention.

Referring now to FIGURE 1 for a simplified version of control of this invention, reference numeral 1 indicates the armature of a series wound DC motor and reference numeral 2, its field winding. The armature 1, field winding 2 and a silicon controlled rectifier 10 are electrically connected in series to lines 3 and 4 from a source of AC current not here shown. A conductor electrically connecting the armature 1 to the field 2 is designated 3' and electrically connecting the field 2 to the rectifier 10, is designated 4'. A diode 8, electrically connected in parallel with the field winding, provides a path for continued field current during the off part of the rectifier cycle. This diode can be eliminated if desired but variations in the residual magnetic field between motors may cause practical problems. A coil 11 of a transformer 12 is electrically connected to the gate of the SCR 10 at one of its ends, and to the line 4 at its other end. Electrically connected between the lines 3' and 4, are, in series, an avalanche diode 15, a resistor 16 and a diode 17, all part of a triggering circuit 5. The avalanche diode 15 and the diode 17 are arranged to conduct in a direction toward the line 4. A potentiometer 20 has a resistance element 21 connected at one end to the conductor 3' between the armature 1 and the field 2 and at the other end, to a conductor 18 between the resistor 16 and the avalanche diode 15, by means of an electrical conductor 22. The potentiometer 20 has an arm 25, slidably electrically connected to the resistance element 21, and electrically connected, through a speed command resistor 27, to a mixing point 28 at the base of a transistor 40. A feed-back resistor 30 is electrically connected to the mixing point 28 at one end, and at its other end, is electrically connected to the line 3, between the source and the armature 1, by means of an electrical conductor 31.

An emitter 41 of the transistor 40, is electrically connected, through a resistor 42, to the line 3'. A collector 43 of the transistor 40 is electrically connected to one side of a capacitor 45, the other side of which is connected to the conductor 22. The collector 43 is also electrically connected to the emitter of a unijunction transistor 50. The unijunction transistor 50 is electrically connected, through a resistor 53, to the line 3', and through a coil 51 of the transformer 12, to the conductor 22. The transistor 40 and resistor 42 form an amplifier circuit 6.

In operation, the rate of charging of the capacitor 45 is an inverse function of the feed-back current through the resistor 30, which, in turn, is a function of the potential difference between the line 3 and the potentiometer arm 25. Thus, if the motor slows down, the CEMF generated by the armature, rotating in the residual magnetic field of the motor, is decreased, which results in an increase in the signal from the transistor 40, which increases the charging rate of the capacitor 45. The capacitor 45 discharges through the unijunction transistor 50 at a predetermined triggering voltage, through the transformer coil 51, which triggers the SCR 10. Thus, the more quickly the capacitor 45 charges to the critical voltage, the greater will be the average voltage, applied to the motor, because the rectifier 10 will be triggered more nearly at the beginning of the half cycle through which it can conduct. Conversely, if the motor speeds up, its CEMF will increase, which results in a decrease in the signal to the amplifier, which in turn reduces the charging rate of the capacitor 45, and delays the triggering of the rectifier 10.

It will be observed that, in the arrangement shown, the correct polarity is obtained without the requirement of inverting the feed-back signal. This is achieved by connecting the armature electrically in series with the parallel combination of the control circuits, the field winding and the SCR as distinguished from having the control circuit electrically connected in parallel with the serially connected armature, field winding and rectifier.

A problem posed by this simplified version of the control of this invention is in obtaining smooth, even firing. Stability could easily be achieved by adding a capacitor between the base of the transistor 40 and the junction of the field winding and armature. However, this capacitor would integrate the armature voltage wave form. This would result in a feed-back signal that no longer represents speed. To resolve this problem, the preferred embodiment of control of this invention has been devised, and is illustrated in FIGURE 2.

Figure 2:
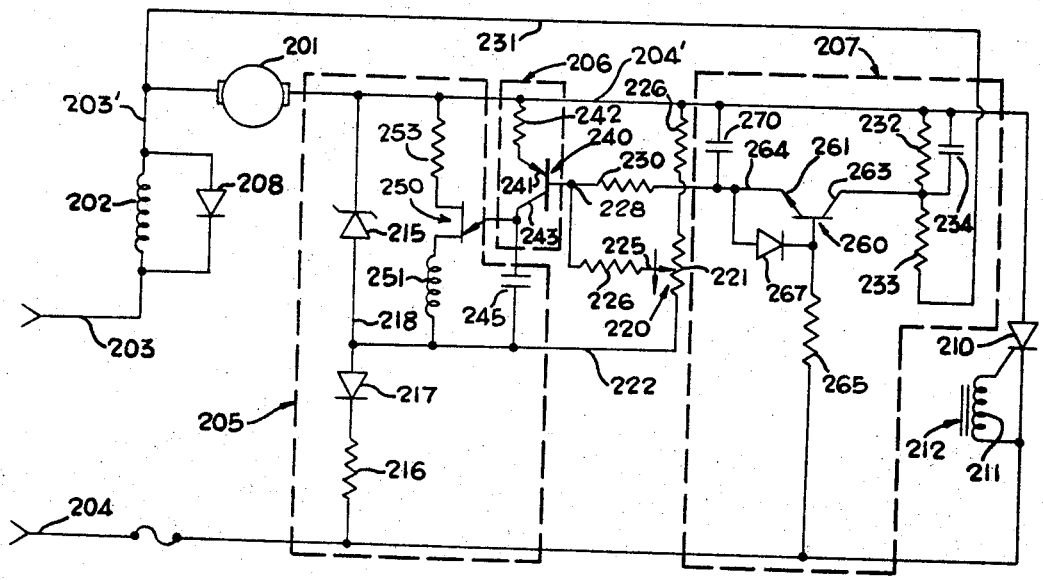
FIGURE 2 is a diagrammatic representation of the preferred form of control circuit of this invention.

Referring now to FIGURE 2 for the preferred embodiment, reference numeral 201 indicates the armature of a motor, which motor has a field winding 202, electrically connected in series with the armature 201. A silicon controlled rectifier 210 is electrically connected in series with the armature and field winding, and all three are connected, in series, to lines 203 and 204 which are connected to a source of alternating current, not here shown. A conductor electrically connecting the field 202 and armature 201 is designated 203', and electrically connecting the armature and the SCR 210, is designated 204'. A diode 208, connected in parallel with the field winding 202, and a coil 211 connected to the SCR 210, perform the same function as their counterparts in the first embodiment described.

A triggering circuit 205 has a capacitor 245, a unijunction transistor 250, a resistor 253, a transformer coil 251 and a diode 217, a resistor 216, an avalanche diode 215 and a conductor 218 between the diodes 215 and 217, and is identical with the triggering circuit of the embodiment shown in FIGURE 1, which is a standard triggering circuit. An amplifier circuit, in the form of a transistor 240 with an emitter 241 and collector 243, and resistor 242, identical with their counterparts in the embodiment shown in FIGURE 1, is designated 206.

In this embodiment, a sampling circuit 207 is provided which includes a resistor 233 electrically connected by an electrical conductor 231 to the conductor 203' at the junction between the armature 201 and the field 202 a resistor 232, connected electrically at one end to the resistor 233 and at its other end to the conductor 204' hence to the armature, a capacitor 234, one side of which is electrically connected to the conductor 204' and the other, between the resistors 233 and 232, at which point, a collector 263 of a transistor 260 is also electrically connected. The transistor 260 has an emitter 261 which is electrically connected in series with a feed-back resistor 230 by means of an electrical conductor 264. A sampling capacitor 270 is connected electrically at one side to the conductor 204', and at the other, to the conductor 264. A diode 267 is electrically connected to the conductor 264, and to the base of the transistor 260. Also connected to the base of the transistor 260 is a resistor 265, which is electrically connected to the line 204.

A potentiometer 220 has a resistance element 221 and an arm 225. The element 221 is connected, through a resistor 226 at one end to the conductor 204' and, by means of an electrical conductor 222, to the conductor 218 between the diode 217 and the avalanche diode 215 in the triggering circuit. The resistor 226 and resistance element 221 and arm 225 serve as a convenient form of variable voltage source.

Figure 3:
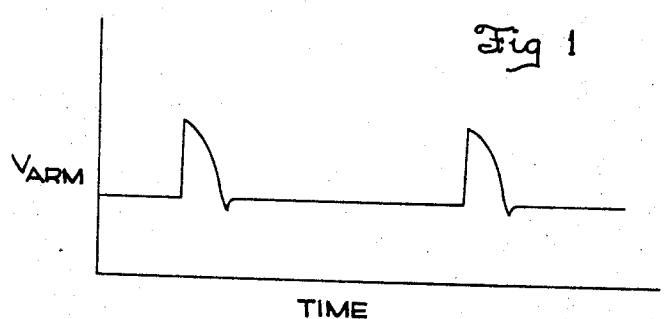
FIGURE 3 is a graph illustrating armature voltage against time.

In the operation of the embodiment of control shown in FIGURE 2, the transistor 260 acts as a switch, energized only when the line 204 is positive with respect to the line 203, i.e., during the off half cycle. During this time, the feed-back of the CEMF through the resistor 233, acts to charge the sampling capacitor 270 to a voltage corresponding to the flat portion of the curve in the graph FIGURE 3. This is a measure of speed. During this same time, the diode 217 does not conduct, so that the amplifying and triggering circuits are not energized. The capacitance of the capacitor 270 is high as compared with the capacitance of the capacitors 234 and 245, e.g., 20 microfarads as compared with .1 microfarad. The potential of the sampling capacitor 270 is then compared at the mixing point 228 with the speed command signal from the potentiometer 220, and the difference determines the charging rate of the capacitor 245, as in the embodiment of FIGURE 1. Thus the capacitor 270 smooths the operation of the control, but does not integrate the wave forms, since it is charged only on the off cycle when its charge is strictly a function of the counter electromotive force.

Numerous variations in the speed control of this invention within the scope of the appended claims will occur to those skilled in the art in the light of the foregoing disclosure. Equivalent components can be substituted. Thus, for example, discrete resistors with a selector switch to put them selectively into the circuit, or any commonly available variable voltage source may be substituted for the conventional potentiometer shown in the drawings, and all such devices are encompassed within the term potentiometer as used in the appended claims. Different circuitry in the conventional portions of the control can be used. For example, referring to FIGURE 2, that control circuit may be adapted to a shunt wound motor by disconnecting the line 203 from the connection to the field winding 202 shown and connecting it at the junction of the field winding 202, armature 201 and conductor 231, and connecting a diode to and between the point at which line 203 was previously connected and the line 204 in a direction to conduct when line 204 is positive with respect to line 203. These variations are merely illustrative.

Having thus described the invention, what is claimed and desired to be secured by Letters Patent is:

1. In a control for a series wound motor having an armature and a field winding electrically connected in series to which current is supplied through a half wave controlled rectifier electrically connected in series with the armature and field winding, the improvement comprising a control circuit electrically connected in series with the armature and in parallel with the half wave controlled rectifier, said control circuit including a triggering circuit electrically connected to said controlled rectifier, an amplifier, electrically connected to said triggering circuit, a potentiometer electrically connected to said amplifier, a switch, operative only during the off cycle, electrically connected to the armature, a capacitor electrically connected to said switch, and a feed-back resistor electrically connected to said switch and to said amplifier with said potentiometer and to said capacitor whereby counter electromotive force generated by said armature during that portion of the half cycle immediately preceding rectifier conduction is stored in said capacitor and compared with a speed control signal from said potentiometer and the resultant potential governs the rate of operation of said amplifier to precipitate operation of said triggering circuit, hence said controlled rectifier.

2. The control of claim 1 wherein the control circuit is electrically connected in parallel with the field winding.

3. In a control for a motor having an armature and a field winding to which current is supplied through a controlled rectifier electrically connected in series with the armature, the improvement comprising a control circuit electrically connected in series with the armature and in parallel with the controlled rectifier, said control circuit including a triggering circuit electrically connected to said controlled rectifier, an amplifier electrically connected to said triggering circuit, a potentiometer electrically connected to said amplifier, a switch, operative only during the off cycle, electrically connected to the armature, a capacitor electrically connected to said switch, and a feed-back resistor electrically connected to said switch and to said amplifier with said potentiometer and to said capacitor, whereby said capacitor is charged only by the counter electromotive force generated by said armature, during the off cycle, and the potential of said capacitor, imposed on the feed-back resistor, is compared electrically with a speed control signal from said potentiometer and the resultant potential governs the rate of operation of said amplifier to precipitate operation of said triggering circuit, hence said controlled rectifier.

4. The control of claim 3, wherein the switch is a transistor.

References Cited

UNITED STATES PATENTS

| 3,095,534 | 6/1963 | Cockrell | 318—331 X |
| 3,177,417 | 4/1965 | Wright | 318—331 |
| 3,177,418 | 4/1965 | Meng | 318—331 |
| 3,278,821 | 10/1966 | Gutzwiller | 318—331 |
| 3,283,234 | 11/1966 | Dinger | 318—331 |

ORIS L. RADER, *Primary Examiner.*

J. J. BAKER, *Assistant Examiner.*